United States Patent
Barney et al.

(10) Patent No.: US 9,277,278 B2
(45) Date of Patent: *Mar. 1, 2016

(54) SYSTEMS AND METHODS FOR ENHANCING AUDIENCE MEASUREMENT DATA

(71) Applicant: Google Inc., Mountain View, CA (US)

(72) Inventors: David Barney, Mountain View, CA (US); Chao Cai, San Jose, CA (US); Timothy Wright, Mountain View, CA (US); William Patrick Kee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/527,481

(22) Filed: Oct. 29, 2014

(65) Prior Publication Data

US 2015/0237395 A1 Aug. 20, 2015

Related U.S. Application Data

(63) Continuation of application No. 14/185,534, filed on Feb. 20, 2014, now Pat. No. 8,910,195.

(51) Int. Cl.
*H04H 60/32* (2008.01)
*H04N 21/442* (2011.01)
*H04N 21/258* (2011.01)

(52) U.S. Cl.
CPC ... *H04N 21/44213* (2013.01); *H04N 21/25883* (2013.01)

(58) Field of Classification Search
CPC ............... H04N 21/44213; H04N 21/25883
See application file for complete search history.

(56) References Cited

U.S. PATENT DOCUMENTS

| | | | |
|---|---|---|---|
| 6,530,082 B1 | 3/2003 | Del Sesto et al. | |
| 7,260,823 B2* | 8/2007 | Schlack et al. | 725/9 |
| 8,108,517 B2* | 1/2012 | Kalavade | 709/224 |
| 8,239,886 B2* | 8/2012 | Savoor et al. | 725/14 |
| 8,307,006 B2 | 11/2012 | Hannan et al. | |
| 8,365,213 B1* | 1/2013 | Orlowski | 725/13 |
| 8,429,266 B2 | 4/2013 | Vanheuverzwyn | |
| 8,448,057 B1 | 5/2013 | Sugnet et al. | |
| 8,539,520 B2 | 9/2013 | Falcon | |
| 8,549,103 B2 | 10/2013 | Bhatia et al. | |

(Continued)

FOREIGN PATENT DOCUMENTS

WO WO-00/54201 A2 9/2000

OTHER PUBLICATIONS

International Search Report and Written Opinion mailed Sep. 5, 2014 in PCT Application No. PCT/US2014/033648.

(Continued)

*Primary Examiner* — Oschta Montoya
(74) *Attorney, Agent, or Firm* — Foley & Lardner LLP; John D. Lanza

(57) ABSTRACT

The present disclosure provides systems and methods for enhancing audience measurement data. Offline and online audience measurement data may be compared and correlated to improve the quality of each data and source set. Positive correlations between the offline and online data sets related to a particular event may indicate demographic traits that are likely true, such that outliers may be removed from the set or considered at a reduced weight. Negative correlations may indicate that demographic information within a source set, such as the online measurement data, may be false or suspect.

20 Claims, 5 Drawing Sheets

(56) References Cited

U.S. PATENT DOCUMENTS

| | | |
|---|---|---|
| 2003/0056208 A1 | 3/2003 | Kamada et al. |
| 2003/0115586 A1 | 6/2003 | Lejouan et al. |
| 2011/0016482 A1* | 1/2011 | Tidwell et al. .................. 725/14 |
| 2011/0087519 A1 | 4/2011 | Fordyce et al. |
| 2013/0013737 A1 | 1/2013 | Rehiman et al. |
| 2013/0014136 A1 | 1/2013 | Bhatia et al. |
| 2013/0014137 A1 | 1/2013 | Bhatia et al. |
| 2013/0018719 A1 | 1/2013 | Abraham et al. |
| 2013/0024879 A1 | 1/2013 | Bruich et al. |
| 2013/0035979 A1 | 2/2013 | Tenbrock |
| 2013/0132989 A1 | 5/2013 | Han et al. |
| 2013/0198125 A1* | 8/2013 | Oliver et al. .................... 706/46 |
| 2013/0254787 A1* | 9/2013 | Cox et al. ........................ 725/13 |
| 2013/0268623 A1 | 10/2013 | Besehanic et al. |
| 2013/0318193 A1 | 11/2013 | Koli et al. |
| 2013/0332604 A1 | 12/2013 | Seth et al. |
| 2014/0007147 A1 | 1/2014 | Anderson |
| 2014/0013343 A1 | 1/2014 | Bovenschulte et al. |

OTHER PUBLICATIONS

Notice of Allowance on U.S. Appl. No. 14/185,534 dated Oct. 20, 2014.

* cited by examiner

SYSTEMS AND METHODS FOR ENHANCING AUDIENCE MEASUREMENT DATA

RELATED APPLICATIONS

This application claims priority to and is a continuation of U.S. patent application Ser. No. 14/185,534, entitled "Systems and Methods for Enhancing Audience Measurement Data," filed Feb. 20, 2014, the entirety of which is hereby incorporated by reference.

BACKGROUND

Traditional broadcast audience measurement systems utilize single-source data panels consisting of individuals or households recording media exposure over time. Because these individuals are typically paid for participation, measurement data tends to be of high quality, but for a limited population size. Accordingly, statistical confidence in applying the measurement data to a large population may be low. Conversely, online audience measurement systems may obtain measurement data from a very large population, but this data may be of questionable quality, as users may provide false or incomplete demographic data for various reasons.

SUMMARY

Offline and online audience measurement data may be compared and correlated to improve the quality of each data and source set. Positive correlations between the offline and online data sets related to a particular event may indicate demographic traits that are likely true, such that outliers may be removed from the set or considered at a reduced weight. Negative correlations may indicate that demographic information within a source set, such as the online measurement data, may be false or suspect.

One implementation disclosed herein is a method for enhancing audience measurement data. The method includes receiving, by an audience measurement server from an audience measurement provider, demographic data for a broadcast event. The method also includes identifying, by the audience measurement server, a plurality of communications from a corresponding plurality of client devices, the plurality of communications associated with the broadcast event. The method further includes receiving, by the audience measurement server, demographic information for each of the plurality of client devices. The method also includes calculating, by the audience measurement server, a correlation between a first value of the received demographic information for each of the plurality of client devices and a corresponding value of the received demographic data for the broadcast event. The method also includes determining, by the audience measurement server, that the correlation exceeds a predetermined threshold. The method further includes identifying demographic information of a first client device of the plurality of client devices as suspect, by the audience measurement server, responsive to the determination that the correlation exceeds the predetermined threshold and responsive to the demographic information of the first client device not including the first value.

In some implementations, the method includes receiving demographic data from an audience panel provider for a broadcast block including the event. In other implementations, the method includes identifying a plurality of requests for content associated with the broadcast event within a predetermined period of time from the broadcast event. In still other implementations, the method includes identifying a plurality of search queries for terms associated with the broadcast event within a predetermined period of time from the broadcast event. In yet still other implementations, the method includes receiving results of a demographic survey for each of the plurality of client devices.

In some implementations, the method includes aggregating the received demographic information for each of the plurality of client devices, and correlating the aggregated demographic information and the received demographic data for the broadcast event. In some implementations, the method includes increasing a confidence score of the first value of the received demographic data from the audience panel provider, responsive to the correlation exceeding the predetermined threshold. In other implementations, the method includes decreasing a confidence score of the received demographic information for each of the plurality of client devices not including the first value.

In one implementation, the method includes calculating, by the audience measurement server, a correlation between a second value of the received demographic information for each of the plurality of client devices and a corresponding second value of the received demographic data for the broadcast event. The method also includes determining, by the audience measurement server, that the correlation does not exceed the predetermined threshold; and decreasing a confidence score of the received demographic data for the broadcast event.

Another implementation presented in the present disclosure is a system for enhancing audience measurement data. The system includes a first device in communication with a plurality of client devices and an audience panel provider, comprising a processor and a memory. The processor is configured for receiving, from the audience measurement provider, demographic data for a broadcast event. The processor is also configured for identifying a plurality of communications from the plurality of client devices, the plurality of communications associated with the broadcast event. The processor is further configured for receiving demographic information for each of the plurality of client devices. The processor is also configured for calculating a correlation between a first value of the received demographic information for each of the plurality of client devices and a corresponding value of the received demographic data for the broadcast event. The processor is further configured for determining that the correlation exceeds a predetermined threshold; and identifying demographic information of a first client device of the plurality of client devices as suspect, responsive to the determination that the correlation exceeds the predetermined threshold and responsive to the demographic information of the first client device not including the first value.

In some implementations of the system, the processor is further configured for receiving demographic data from an audience panel provider for a broadcast block including the event. In other implementations of the system, the processor is further configured for identifying a plurality of requests for content associated with the broadcast event within a predetermined period of time from the broadcast event. In still other implementations, the processor is further configured for identifying a plurality of search queries for terms associated with the broadcast event within a predetermined period of time from the broadcast event. In yet still other implementations, the processor is further configured for receiving results of a demographic survey for each of the plurality of client devices.

In some implementations of the system, the processor is further configured for aggregating the received demographic information for each of the plurality of client devices, and correlating the aggregated demographic information and the received demographic data for the broadcast event. In other implementations, the processor is further configured for increasing a confidence score of the first value of the received demographic data from the audience panel provider, responsive to the correlation exceeding the predetermined threshold. In still other implementations, the processor is further configured for decreasing a confidence score of the received demographic information for each of the plurality of client devices not including the first value.

In some implementations of the system, the processor is further configured for calculating a correlation between a second value of the received demographic information for each of the plurality of client devices and a corresponding second value of the received demographic data for the broadcast event; determining that the correlation does not exceed the predetermined threshold; and decreasing a confidence score of the received demographic data for the broadcast event.

Still another implementation presented in the present disclosure is a computer-readable storage medium storing instructions that when executed by one or more data processors, cause the one or more data processors to perform operations including receiving, from an audience panel provider, demographic data for a broadcast event. The operations also include identifying, by the audience measurement server, a plurality of communications from a corresponding plurality of client devices, the plurality of communications associated with the broadcast event. The operations further include receiving demographic information for each of the plurality of client devices. The operations also include calculating a correlation between a first value of the received demographic information for each of the plurality of client devices and a corresponding value of the received demographic data for the broadcast event. The operations also include determining that the correlation exceeds a predetermined threshold; and identifying demographic information of a first client device of the plurality of client devices as suspect, responsive to the determination that the correlation exceeds the predetermined threshold and responsive to the demographic information of the first client device not including the first value.

In some implementations of the computer-readable storage medium, the instructions further cause the one or more data processors to perform operations including calculating a correlation between a second value of the received demographic information for each of the plurality of client devices and a corresponding second value of the received demographic data for the broadcast event; determining that the correlation does not exceed the predetermined threshold; and decreasing a confidence score of the received demographic data for the broadcast event.

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Audience measurement data of broadcast media from traditional panel providers is typically associated with a broadcast event or block of time. Panel participants who have agreed to participate in the panel may indicate to the panel provider that they watched or listened to a particular event or station during a particular time period, such as a television show; a radio program; a movie; a commercial break; an identified time period such as a minute, ten minutes, half hour, or any other such time period; or any other such information. A panel participant may provide a diary or log, or wear or carry a portable device that detects content played back in the vicinity and records a log for subsequent transmission to the panel provider. Panel providers may aggregate and anonymize demographic information about each panel participant that watched or listened to the event to create an audience profile, indicating traits such as percentage of the audience that is a specified gender, age, from a particular location, or other such information. Measurement of the audience of the content may be useful for measuring audience size or popularity of content for pricing and selling advertisement placements, planning content delivery schedules, or other such purposes. Because traditional panel providers pay panel members for participation, such audience measurement data may be of high quality, with very accurate demographic information, but with a small sample or group size.

Audience measurement data may also be obtained online by monitoring requests for content, such as particular websites, documents, search queries, audio, video, multimedia, text, animation, advertising or other data associated with the broadcast event. An audience measurement server may receive information about requests for content or a rate of requests for content during a time period associated with the broadcast event, and may extract or filter the information for requests for content associated with the broadcast event. Requests for sports statistics during the broadcast of a sporting event, or requests for a website at an address displayed in the broadcast, may indicate that the request originated from an audience member, particularly when the requests are closely associated in time with the broadcast event or when the rate of requests significantly increases at the time of the broadcast event compared to a baseline rate of requests.

Figure 1A:
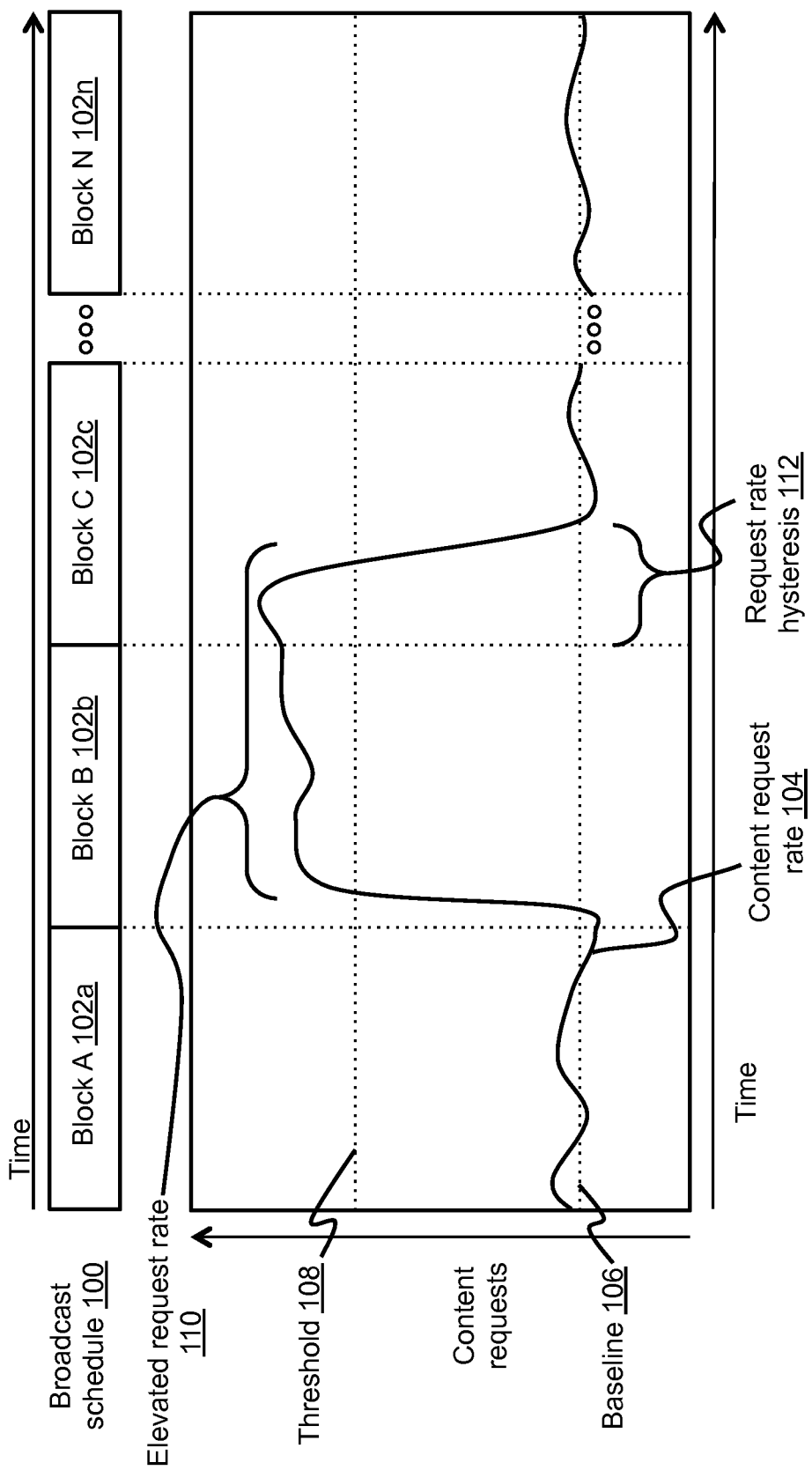
FIG. 1A is a diagram of an illustration of content request rates over time, and associated with broadcast events.

FIG. 1A is a diagram of a sample content request rate 104 over time, associated with broadcast events. As shown, a broadcast schedule 100 for a particular channel, such as a radio, television, cable network, multimedia stream, or other such channel, may include a plurality of blocks 102a-102n, referred to generally as broadcast blocks 102. Although shown with identical durations, in many implementations, blocks 102a-102n may have different sizes, such as a 10 minute block for a first segment of a television program, a 30 second block for a first advertisement, another 30 second block for a second advertisement, a 1 minute block for a third advertisement, and another 10 minute block for a second segment of the program, or any other such sizes. Accordingly, blocks 102 may identify entire programs, portions of programs, interstitial content, or any other such broadcast events. Broadcast events may be distributed via satellite networks, terrestrial broadcast, cable networks, multicast internet protocols, or any other such mediums. Although only one schedule 100 is shown, schedules 100 may exist for a plurality of stations or streams of broadcast events.

Each block 102 may have associated demographic data provided by the panel provider, aggregated and anonymized from diaries or logs of panel participants. In many implementations, this demographic data may be provided to an audience measurement server, discussed in more detail below. Each block 102 may also have associated content, or have an associated classification or category that contextually defines associated content. A block 102 may be associated with a program type, program content, a program class, an address such as a web address displayed in the broadcast stream, a company and/or product name, or any other such information. Content accessible online may also be associated with this information, such as websites associated with the company and/or product name or at the identified address, search results dynamically generated responsive to a search query including the information, or other such content. Accordingly, a request for an item of content may be associated with a block 102, such that information of the requesting device may be compared with demographic data associated with the block 102 and received from panel providers.

A rate of requests for content 104 associated with a broadcast event may vary over time, typically with a baseline rate 106 or average rate during time periods not associated with the broadcast event that may be low or non-zero as illustrated. In other implementations, the rate of requests 104 may be zero during one or more time periods not associated with the broadcast event, particularly with requests for content that is closely associated with the event (e.g. requests for access to a live chat room associated with the live broadcast of the event). During time periods associated with the event, the rate of requests 104 may surge or increase to an elevated level 110. This may be detected when the rate exceeds a threshold 108 for a configured time period. The threshold 108 may be preconfigured or predetermined, or dynamically set based on the baseline 106 (e.g. an order of magnitude larger than the baseline, or any other such amount.

As shown in the sample depicted by FIG. 1A, in many instances, a request rate 104 may become elevated after the beginning of a block 102, and may stay elevated after the ending of the block. This may represent a delay or hysteresis 112 in the request rate, as audience members may request content after the program begins, or may wait until the program is complete before requesting the content. Accordingly, in some implementations, the elevated request rate 110 may be temporally associated with a block 102 (e.g. block B 102b shown in FIG. 1A) if a specified portion of the elevated request rate 110 occurs during the block, such as a midpoint of the elevated request rate period, a majority of the period, etc. In other implementations, the elevated request rate period may be associated with a block based on the requested content. If the program in block A 102a (e.g. a sports program) is significantly different from the program in block B 102b (e.g. a cooking program), and the content requests are contextually associated with the program of block A but not block B (e.g. requests for statistics of the sporting event), then the system may infer that the requests are associated with block A, despite being temporally displaced. This may occur, in some implementations, when audience members wait until the program is concluded before searching for additional information.

Figure 1B:
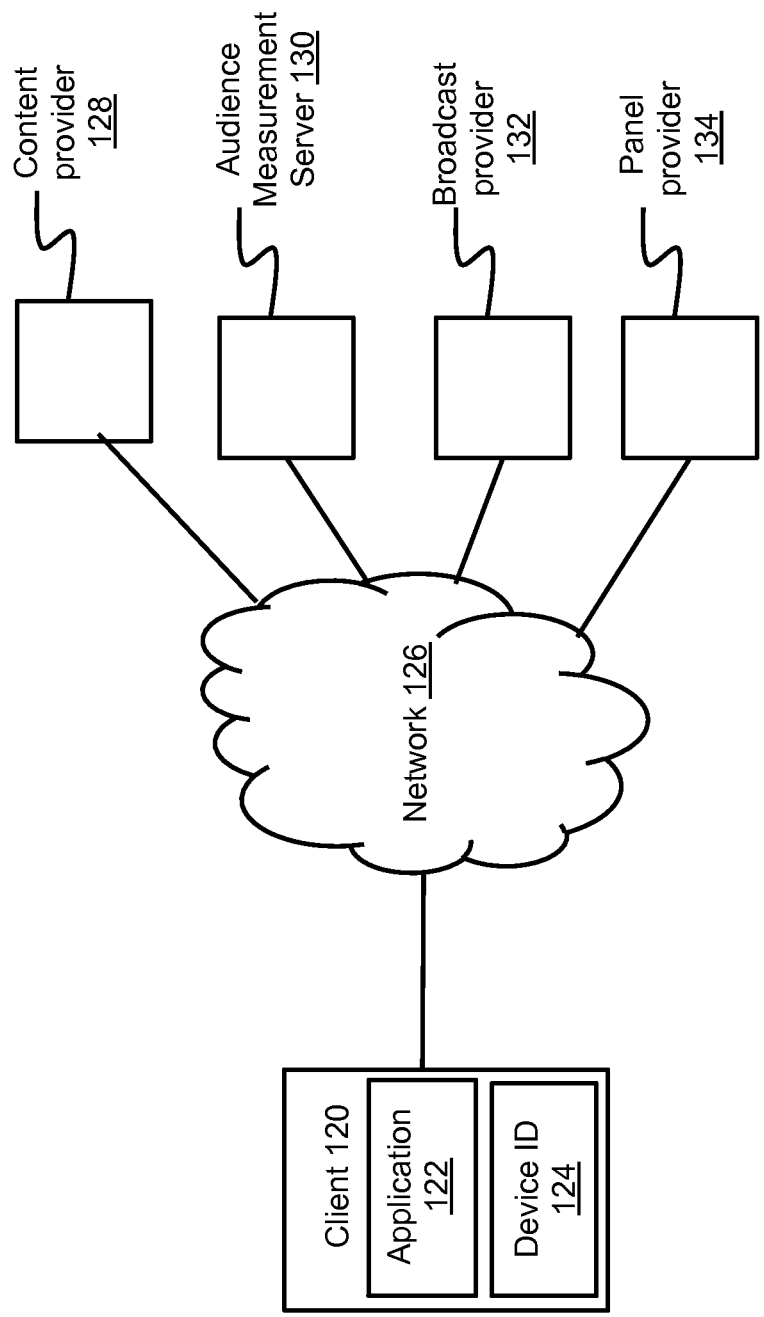
FIG. 1B is a diagram of a system for receiving, correlating, and enhancing audience measurement information.

FIG. 1B illustrates a diagram of an implementation of a system for enhancement of audience measurement data. As shown, a client device 120 may communicate over a network 126 with a content provider 128 and/or an audience measurement server 130. Although only one client device 120, content provider 128, and measurement server 130 are illustrated, in many implementations, a plurality of devices 120 and providers 128 may communicate via one or more networks 126.

A client device 120, referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 126. In some implementations, a client device 120 may execute an application 122, which may be an application, service, server, daemon, routine, or other executable logic for communicating over a network 126, such as a web browser, mail client, video player, music player, video game, or any other such application. Application 122 may include a command line interface, graphical user interface, or any combination of these or other interfaces.

A client device 120 may include a device identifier 124. Device identifier 124 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 124 may be fixed to the device or preconfigured in the device, such as a manufacturer serial number or MAC address, while in other implementations, the device identifier 124 may be dynamically set by a content provider 128, audience measurement server 130, application 122, or other entity, such as a cookie or username. In some implementations, a unique or new device identifier 124 may be set for each communication to a content provider 128 and/or audience measurement server 130, while in other implementations, the device identifier 124 may not be changed, or may be changed periodically (e.g. hourly, daily, weekly, etc.) or at other intervals (e.g. on restart of the client device 120, login to an internet service, etc.).

In some implementations, a client device 120 may execute a data collection agent (discussed in more detail in connection with FIG. 2). A collection agent may be a web browser plug-in or extension, packet sniffer or interceptor, screen scraper, text or data parser, monitor, application, service, daemon, routine, or other executable logic for identifying content provided to client device 120 and transmitting an identification of the content (and, in some implementations, the device identifier 124) to an audience measurement server 130. In many implementations, a data collection agent may be part of an application 122, or may be a separate application or service. In other implementations, a data collection agent may be executed by an intermediary device (not illustrated) deployed between client 120 and network 126 and/or content provider(s) 128.

Client device 120 may communicate with content provider(s) 128 and/or audience measurement server 130, or other client devices 120, servers, or devices via a network 126. Network 126 may be any form of computer network or combinations of networks that relay information between client devices 120, one or more content providers 128, and one or more audience measurement servers 130, as well as other devices not illustrated. Network 126 may include the Internet and/or other types of data networks, such as a local area network (LAN), a wide area network (WAN), a cellular network, satellite network, or other types of data networks. Network 126 may also include any number of computing devices (e.g., computer, servers, routers, network switches, etc.) that are configured to receive and/or transmit data within network 126. Network 126 may further include any number of hardwired and/or wireless connections. A client device 120 may communicate wirelessly (e.g., via WiFi, cellular, radio, etc.) with a transceiver that is hardwired (e.g., via a fiber optic cable, a CAT5 cable, etc.) to other computing devices in network 126. In some implementations, a network 126 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

A content provider 128 may include one or more computing devices connected to network 126 and configured for providing content to a client 120. Content provider 128 may be referred to variously as a content provider, server, web server, data server, publisher, service provider, or by other similar terms. In many implementations, content provider 128 may include a plurality of computing devices configured as a server farm or cloud, and may include routers, load balancers, network address translators, firewalls, or other such devices. Content providers 128 may be computer servers (e.g., FTP servers, file sharing servers, web servers, etc.) or combinations of servers (e.g., data centers, cloud computing platforms, etc.). Content providers 128 may provide any type and form of content, including text, images, video, audio, multimedia, or other data, or any combination of these. Content may include search results, blog or forum content, news articles, movies, television shows, podcasts, video games or other interactive content, advertising in any format, websites, social media, or any other type and form of content. Content provider 128 may be an online search engine that provides search result data to client device 120 in response to a search query. In another illustration, content provider 128 may be a first-party web server that provides webpage data to client device 120 in response to a request for the webpage.

An audience measurement server 130 may include one or more computing devices connected to network 126 and configured for measuring and analyzing audience data. Audience measurement server 130 may be referred to variously as a measurement server, server, web server, data server, service provider, or by other similar terms. In many implementations, an audience measurement server 130 may include a plurality of computing devices configured as a server farm or cloud, and may include routers, load balancers, network address translators, firewalls, or other such devices. In some implementations, an audience measurement server 130 may be a content provider 128.

In some implementations, an audience measurement server 130 may receive identifications of requests for content and/or device identifiers 124 from a client 120. In one such implementation, a client 120 may execute a plug-in or other application to transmit identifications of requests for content to an audience measurement server 130. In another implementation, a request for content may be transmitted from client 120 to audience measurement server 130, which may then redirect the request to an appropriate content provider 128, while recording information about the request. In still another implementation, a request for content may be transmitted from client 120 to a content provider 128, which may respond with the content and embedded instructions causing the client 120 to transmit a second request to the audience measurement server 130. Content delivered from a content provider, such as a web page, may include an embedded one pixel by one pixel image with an address of the audience measurement server 130, such that when a web browser of the client renders the content, the web browser transmits a request for the image to the audience measurement server 130, potentially including parameters or cookies, device identifier 124, or other information.

In other implementations, an audience measurement server 130 may receive identifications of requests for content and/or device identifiers 124 from a content provider 128. A content provider 128 may execute a measurement agent (not illustrated), which may comprise an application, service, server, daemon, or other executable logic for measuring requests from client devices received by the content provider 128. The measurement agent may transmit identifications of the requests to an audience measurement server 130, either individually or aggregated.

In some implementations, an audience measurement server 132 may receive information about a broadcast from a broadcast provider 132 and/or panel provider 134. A broadcast provider 132 may comprise one or more computing devices of a broadcast service, which may provide one or more streams of content to client devices 120, or in some implementations, may provide information to an audience measurement server 130 about a stream of content broadcast to an audience via other systems, such as terrestrial, satellite, or cable broadcasts. A broadcast provider 132 may provide a schedule 100 to an audience measurement server 130, which may identify one or more blocks of content 102. In some implementations, the broadcast provider 132 may provide information about the blocks of content, such as a program type, program title, program description, program-associated keywords, websites or other documents associated with the program, products and/or manufacturers associated with the program, or any other such information. The audience measurement server 130 may use such information to identify requests that are associated with each block, such as requests including the program-associated keywords or requests for a website associated with the program. In other implementations, this information may be provided by a content provider 128 and/or a panel provider 134.

A panel provider 134 may comprise one or more computing devices for aggregating and/or anonymizing panel diaries or logs and transmitting demographic information for a block of content to an audience measurement server 130. In many implementations, the panel provider 134 may transmit an identification of the corresponding broadcast block and/or information about the blocks of content to the audience measurement server 130, such as a program type, program title, program description, program-associated keywords, websites or other documents associated with the program, products and/or manufacturers associated with the program, or any other such information. The panel provider 134 may also provide associated demographic information of an audience of the block, such as a percentage of the audience having a specified trait. In many implementations, the panel provider 134 may provide panel audience measurement information periodically to the audience measurement server 130, covering a specified period of time. The panel provider 134 may provide panel measurement information for a previous quarter, month, week, day, or any other such time period. In other implementations, the panel provider 134 may provide real-time measurement information as it is received, aggregated, and potentially anonymized from panel members. In implementations in which panel participants provide real-time viewing and/or listening information, such as via a portable device, the panel provider 134 may provide real-time audience demographic information to the audience measurement server 130.

Figure 2A:
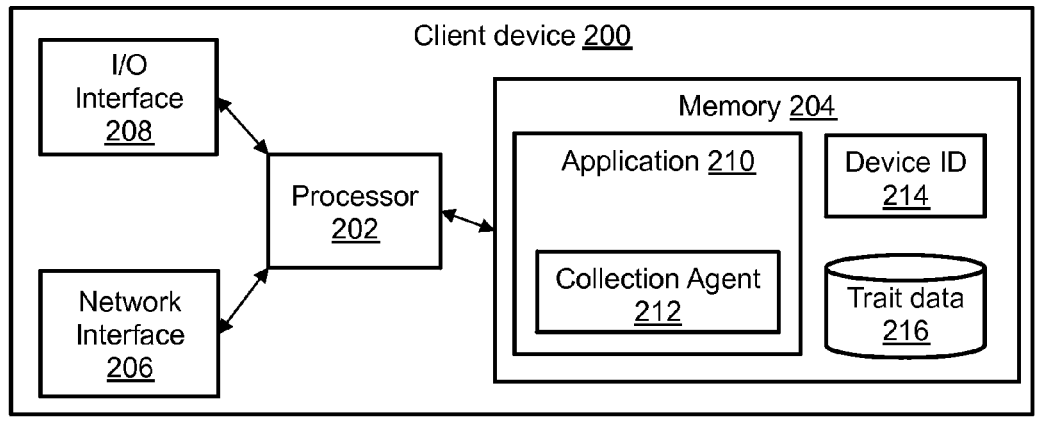
FIG. 2A is a block diagram of a client device, according to one implementation.

Illustrated in FIG. 2A is a block diagram of one implementation of a computing device 200 of a client, panel participant, or non-panel participant, such as client devices 120. Client device 200 may be any number of different types of user electronic devices configured to communicate via network 126, including without limitation, a laptop computer, a desktop computer, a tablet computer, a smartphone, a digital video recorder, a set-top box for a television, a video game console, or any other type and form of computing device or combinations of devices. In some implementations, the type of client device 200 may be categorized as a mobile device, a desktop device or a device intended to remain stationary or configured to primarily access network 126 via a local area network, or another category of electronic devices such as a media consumption device.

In many implementations, client device 200 includes a processor 202 and a memory 204. Memory 204 may store machine instructions that, when executed by processor 202 cause processor 202 to perform one or more of the operations described herein. Processor 202 may include a microprocessor, ASIC, FPGA, etc., or combinations thereof. In many implementations, processor 202 may be a multi-core processor or an array of processors. Memory 202 may include, but is not limited to, electronic, optical, magnetic, or any other storage devices capable of providing processor 202 with program instructions. Memory 202 may include a floppy disk, CD-ROM, DVD, magnetic disk, memory chip, ROM, RAM, EEPROM, EPROM, flash memory, optical media, or any other suitable memory from which processor 202 can read instructions. The instructions may include code from any suitable computer programming language such as, but not limited to, C, C++, C#, Java, JavaScript, Perl, HTML, XML, Python and Visual Basic.

Client device 200 may include one or more network interfaces 206. A network interface 206 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 126. In many implementations, client device 200 may include a plurality of network interfaces 206 of different types, allowing for connections to a variety of networks 126 or a network 126 such as the Internet via different sub-networks.

Client device 200 may include one or more user interface devices 208. A user interface device 208 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 200, such as a built-in display, touch screen, microphone, etc., or external to the housing of client device 200, such as a monitor connected to client device 200, a speaker connected to client device 200, etc., according to various implementations.

Client device 200 may include in memory 204 an application 210 or may execute an application 210 with a processor 202. Application 210 may be an application, applet, script, service, daemon, routine, or other executable logic for receiving content and for transmitting responses, commands, or other data. In one implementation, application 210 may be a web browser, while in another implementation, application 210 may be a video game. Application 210 may include functionality for displaying content received via network interface 206 and/or generated locally by processor 202, and for transmitting interactions received via a user interface device 208, such as requests for websites, selections of survey response options, input text strings, etc.

In some implementations, application 210 may include a data collector or collection agent 212. Collection agent 212 may include an application plug-in, application extension, subroutine, browser toolbar, daemon, or other executable logic for collecting data processed by application 210. In other implementations, a collection agent 212 may be a separate application, service, daemon, routine, or other executable logic separate from application 210 but configured for intercepting and/or collecting data processed by application 210, such as a screen scraper, packet interceptor, API hooking process, or other such application. Collection agent 212 may be configured for intercepting or receiving data input via user interface device 208, such as Internet search queries, text strings, survey response selections, or other values, or data received and processed by application 210 including websites visited, time spent interacting with a website or application, pages read, or other such data. In many implementations, collection agent 212 may store some or all of this data or identifiers of such data in a behavior history database or other data structure, and may include identifications of websites visited, web links followed, search queries entered, or other such data. In some implementations, the data may be anonymized or disambiguated to reduce personally identifiable information. In some implementations, rather than recording individual search queries entered, such as a query for "vacation spots in France", a collection agent 212 may identify predetermined categories corresponding to the search queries, such as "European tourism" or "travel" and record an indication of a search relating to the predetermined category. In other implementations, the collection agent 212 may be executed by a server, or by an intermediary device deployed between the client and server, such as a router, cable modem, or other such device. Data requests and responses may be parsed by a collection agent 212 executing on an intermediary router as the requests and responses traverse the router. In some implementations, this may allow for monitoring of all data flow to/from a household, without requiring installation of the collection agent 212 on a plurality of devices within the household. In other implementations, as discussed above, a client device 200 may not execute a collection agent 212; in such implementations, request data may be obtained by an audience measurement server without the use of a collection agent 212, such as via embedded images in rendered content, redirected requests, or other such methods.

Client 200 may include or be identified with a device identifier 214. Device identifier 214 may include any type and form of identification, including without limitation a MAC address, text and/or numerical data string, a username, a cryptographic public key, cookies, device serial numbers, user profile data, network addresses, or any other such identifier that may be used to distinguish the client 200 from other clients 200. In some implementations, a device identifier 214 may be associated with one or more other device identifiers 214 (e.g., a device identifier for a mobile device, a device identifier for a home computer, etc.). In many implementations, as discussed above, a device identifier 214 may be generated and/or transmitted to the device 200 by a content provider. In other implementations, as discussed above, client 200 may request a device identifier or cookie 214 from an audience measurement server or content provider, and may transmit the device identifier or cookie 214 to the audience measurement server provider or content provider in association with requests for content.

In some implementations, client 200 may include characteristic data 216, identifying one or more demographic characteristics or values for such characteristics. Characteristic data 216 may be entered as part of a profile, in response to a survey, or by other such means, and may be provided to an audience measurement server and/or content provider in connection with a request for content. In other implementations, characteristic data 216 may be stored by the audience measurement server and associated with a device identifier 214. In such implementations, the audience measurement server may retrieve the characteristic data 216, responsive to receiving a request for content and the device identifier 214. As discussed above, in many implementations, the characteristic data 216 may be false or untrustworthy, for various reasons.

In many implementations, the collected characteristic data may be anonymized or disambiguated to protect the privacy of the device user. In many such implementations or similar situations in which personal information about the user of a client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). In some implementations, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Figure 2B:
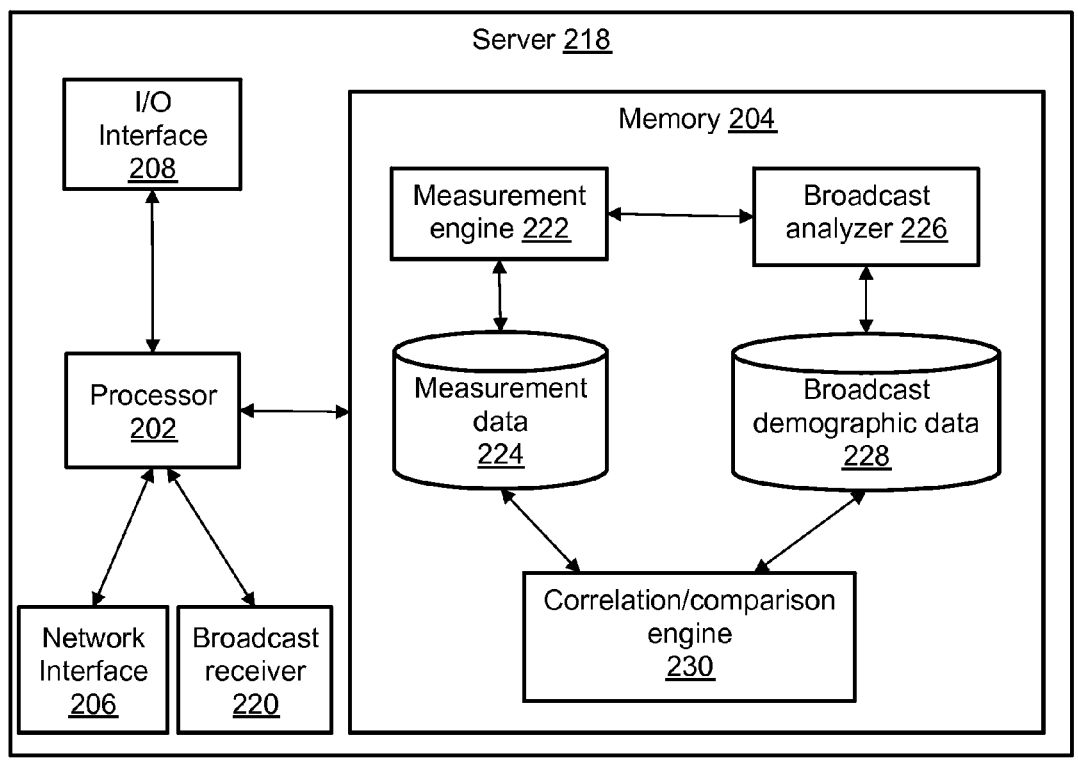
FIG. 2B is a block diagram of a server device, according to one implementation.

Referring now to FIG. 2B, illustrated is a block diagram of an implementation of a computing device or server 218, such as an audience measurement server 130, content provider 128, broadcast provider 132, or panel provider 134, as discussed above in connection with FIG. 1B. As with client devices 200, server 218 may include one or more processors 202, memories 204, network interfaces 206, and user interfaces 208. In some implementations referred to as headless servers, a server 218 may not include a user interface 208, but may communicate with clients 200 with user interfaces 208 via a network 126. Memory 204 may include content storage (not illustrated), such as storage of webpages, images, audio files, video files, data files, or any other type and form of data. In some implementations, memory 204 may store one or more applications 210 (not illustrated) for execution by processor 202 of the server 218, including FTP servers, web servers, mail servers, file sharing servers, peer to peer servers, or other such applications for delivering content stored in content storage.

In some implementations, a server 218 may include a broadcast receiver 220. Broadcast receiver 220 may comprise hardware and/or software for receiving and/or analyzing a broadcast. In one such implementation, a server 218 may include an antenna and analog-to-digital converter for receiving a broadcast signal and decoding an audio and/or video stream from the signal, such as a television tuner. In such implementations, a server 218 may execute a broadcast analyzer 226, which may comprise an application, service, daemon, routine, or other executable logic for analyzing a received broadcast stream to identify one or more blocks of content and/or information about said content. In one such implementation, a server 218 may include a radio antenna and decode radio data system (RDS) text associated with a broadcast program, such as names of songs and artists. This data may be used to identify requests for content associated with the broadcast block, such as search queries for said song and/or artist. In other implementations, a server 218 may receive information about a broadcast from a broadcast provider or panel provider, as discussed above.

In some implementations, a server 218 may execute a measurement engine 222. Measurement engine 222 may comprise an application, service, server, daemon, routine, or other executable logic for measuring an audience of an item of content, including receiving device identifiers and/or requests for items of content or information about such requests, aggregating or sorting content identifiers according to a device identifier, and measuring an audience for an item of content during a time period. In one implementation, measurement engine may count the number of content identifiers identifying a particular item of content received over a period of time, such as an hour, associated with distinct device identifiers, to count a size of an audience that received the item of content. This audience measurement may be provided to content providers, advertising providers, marketers, publishers, analysts, or others.

In some implementations, a server 218 may maintain a measurement database 224. A measurement database 224 may comprise any type and form of database, flat file, data file, data array, or other data structure, for storing a plurality of content identifiers with corresponding device identifiers, cookies, and/or session identifiers. In many implementations, a measurement database 224 may also include a timestamp of received or transmitted content identifiers. Measurement database 224 may also include demographic information or characteristics received from a client device, either in connection with a request for content or previously received from the client device and associated with the device identifier. Characteristics may be explicitly obtained, via surveys or profile questions, or may be implicitly obtained, via requests associated with the device being similar to requests associated with a device having known characteristics. Characteristics or traits may be identified with values, such as where a characteristic may have several different potential values. In some implementations, characteristics associated with a broadcast event or block from different devices may be aggregated and/or anonymized.

A server 218 may store broadcast demographic information in a database 228. Broadcast demographic database 228 may comprise any type and form of database, flat file, data file, data array, or other data structure, for storing information about one or more broadcast events or blocks, including a program type, program title, program description, program-associated keywords, websites or other documents associated with the program, products and/or manufacturers associated with the program, or any other such information; as well as demographic information received from a panel provider and associated with a broadcast block or event. The database 228 may comprise identifiers of a program, a description of the program, a time and date the program was broadcast, a channel on which the program was broadcast, a percentage of the audience of the program having a first trait or characteristic as determined by the panel provider, a percentage of the audience of the program having a second trait or characteristic, etc.

Server 218 may execute a correlation or comparison engine 230. Correlation engine 230 may comprise an application, service, server, daemon, routine, or other executable logic for comparing measurement data 224, including aggregated characteristics of devices having requested content associated with a broadcast event or block, with demographic data 228 associated with the broadcast event or block obtained from a panel provider. Correlation engine 230 may use any type and form of algorithm to determine a correlation between a statistical value for presence of a characteristic in aggregated device measurement data 224 and presence of the characteristic in demographic data 228. Correlation engine 230 may use a Pearson correlation algorithm to compare a frequency of a characteristic in data 224 with a frequency of the characteristic in data 228. The resulting correlation coefficient may be compared to a threshold, and a confidence score associated with the characteristic may be increased or decreased responsive to the coefficient being above or below a threshold, as discussed in more detail below.

Figure 3A:
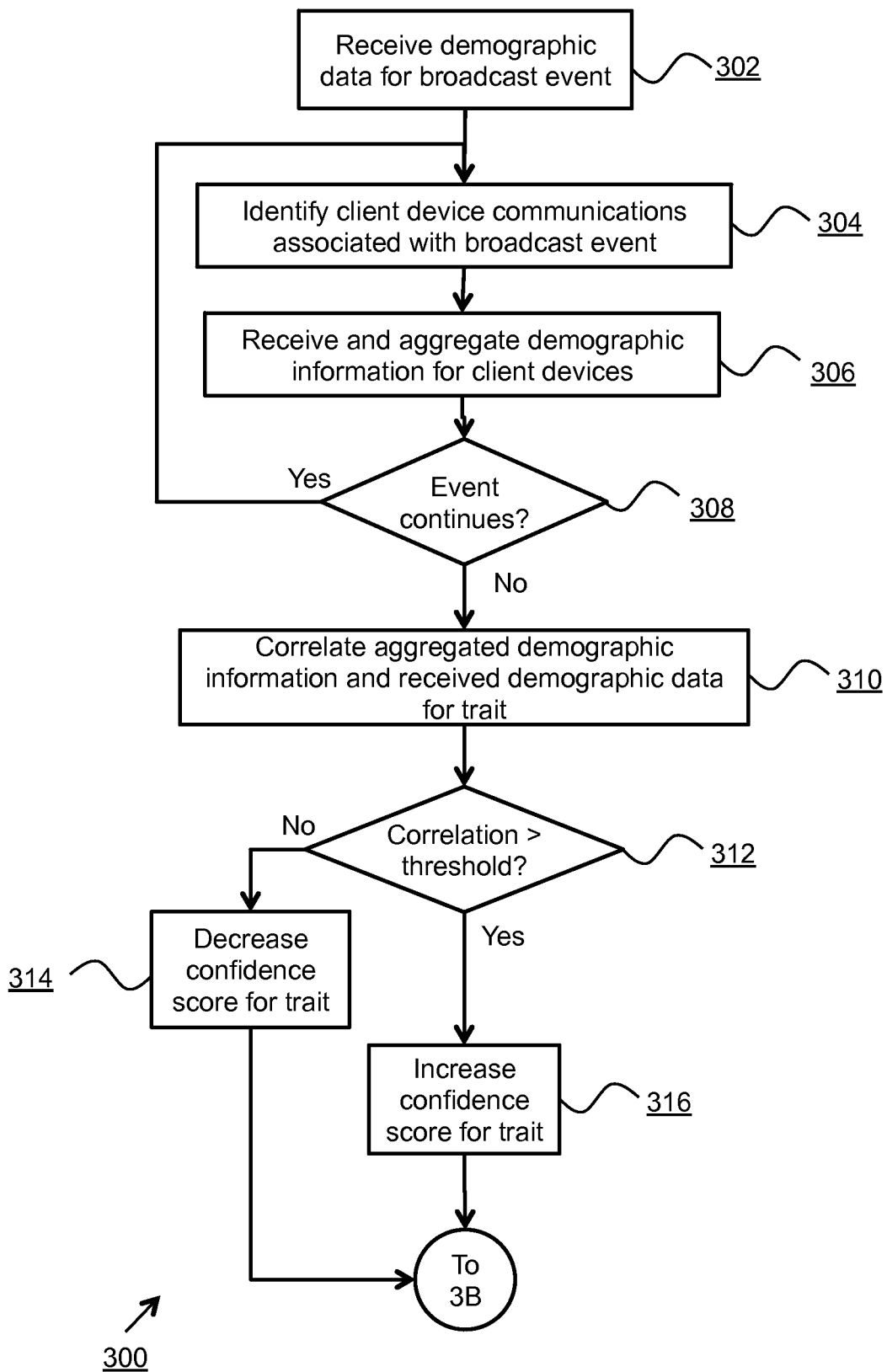
FIGS. 3A-3B are flow diagrams of the steps taken in one implementation of a process for audience measurement enhancement.
Figure 3B:
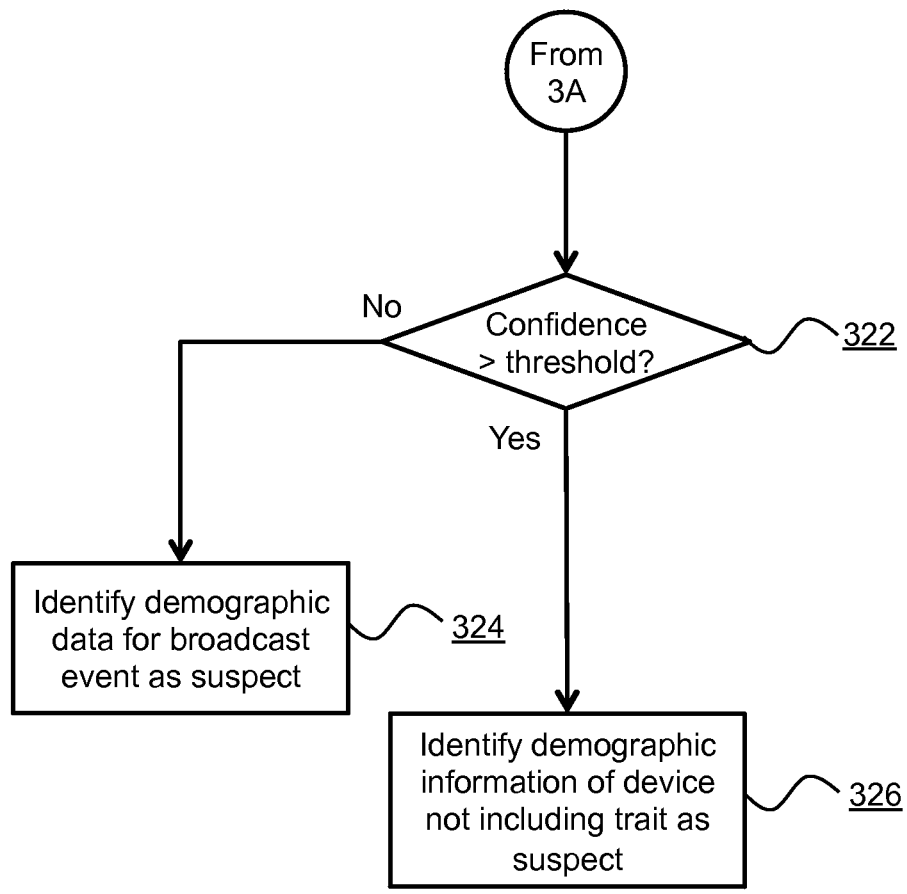

FIGS. 3A-3B are flow charts of an implementation of a method 300, 300' for enhancing demographic information. In brief overview, at step 302, an audience measurement server may receive demographic data for a broadcast event from a panel provider and/or broadcast provider. At step 304, the audience measurement server may identify client device communications associated with the broadcast event, including requests for content. At step 306, the audience measurement server may receive and aggregate demographic information for client devices that have transmitted communications associated with the broadcast event. In some implementations, if the broadcast event continues, steps 304-306 may be repeated.

At step 310, the audience measurement server may correlate the aggregated demographic information of clients with the demographic information received from the panel provider and/or broadcast provider. At step 312, the audience measurement server may determine if the correlation coefficient for a demographic trait exceeds a threshold. If not, then at step 314, the audience measurement server may decrease a confidence score for the trait. If so, then at step 316, the audience measurement server may increase a confidence score for the trait.

At step 322, illustrated on FIG. 3B, the audience measurement server may determine if the confidence score for the characteristic or trait exceeds a threshold. If not, then at step 324, the audience measurement server may identify the demographic data received from the panel provider and/or broadcast provider as potentially suspect. If so, then at step 326, the audience measurement server may identify the demographic information of a device not including the characteristic or trait as potentially suspect.

Returning to FIG. 3A, and in more detail, at step 302, an audience measurement server may receive demographic data for a broadcast event from a panel provider and/or a broadcast provider. Demographic data for the broadcast event may include information about the event, including an identification of the event or broadcast block; a unique or semi-unique identifier or identification code for the event; a program title; a program type; a program classification; a time of day; a day of the week; an Internet address for a multimedia stream, a channel, and/or a broadcast medium; a description of the program or event; a manufacturer, company, and/or product associated with the event; an Internet address, phone number, and/or physical address associated with the event or a company associated with the event; one or more keywords associated with the event; or any other type and form of information. Demographic data for the broadcast event may also include aggregated and, in some implementations, anonymized demographic information about an audience of the event, obtained from panel participants. Such demographic data may identify a characteristic or trait (e.g. an age range) and a corresponding value for the characteristic or trait identifying what percentage of the audience of the event has said characteristic. In many implementations, the demographic data may identify a plurality of characteristics and corresponding values. The data may be transmitted as one or more parameter and value pairs, tables, data arrays or other structures. Although illustrated at the beginning of method 300, in many implementations, the audience measurement server may receive the demographic data at a subsequent point in time, such as prior to step 310.

At step 304, the audience measurement server may identify one or more client communications associated with a broadcast event. As discussed above, communications may be temporally associated with an event, by being transmitted during the event and/or during a time period immediately after the event. Communications may also be contextually associated with the event, such as requests for content including information about the event, such as an identification of the event or broadcast block; a unique or semi-unique identifier or identification code for the event; a program title; a program type; a program classification; a time of day; a day of the week; an Internet address for a multimedia stream, a channel, and/or a broadcast medium; a description of the program or event; a manufacturer, company, and/or product associated with the event; an Internet address, phone number, and/or physical address associated with the event or a company associated with the event; one or more keywords associated with the event; or any other type and form of information. Accordingly, the audience measurement server may identify a communication as associated with the event if it is both temporally and contextually associated with the event. In some implementations, the audience measurement server may identify communications temporally associated with the event responsive to a rate of requests exceeding a threshold above a baseline request rate during a time period other than the event. The audience measurement server may identify communications as associated with the event for the period during which the request rate exceeds the threshold, including during a hysteresis time period after the end of the event, as discussed above in connection with FIG. 1A. Although some communications may not actually be associated with the event (e.g. the communications that represent the typical baseline rate of requests for content that includes keywords or other information that is associated with the event), by extracting communications during a time period of an elevated request rate, it may be inferred that a large portion of the requests are associated with the broadcast event. The threshold may be preconfigured or dynamically set responsive to the baseline rate, such as a multiple of or order of magnitude larger than the baseline rate. The threshold may be set higher in some implementations to ensure that a higher percentage of communications are associated with the event. If the threshold is set at a level equal to twice the baseline rate, and the rate of requests during the event only just exceeds the threshold, then it may be assumed that approximately 50% of the communications are associated with the event. Conversely, if the threshold is set at a level equal to ten times the baseline rate, then it may be assumed that approximately 90% of the communications are associated with the event. In some implementations, the threshold may be dynamically adjusted during the event to just below a sustained request rate during the event to ensure a capture period during which the highest number of requests are likely to be from audience members of the broadcast event.

As discussed above, the audience measurement server may receive communications from client devices, from content providers, from a combination of client devices and content providers, and/or from one or more other devices. In one implementation, the audience measurement server may receive requests from a client device and forward requests to a content provider. In another implementation, the audience measurement server may receive an identification of requests received by a content provider from said content provider. In still another implementation, the audience measurement server may receive a request for content generated responsive to receipt and rendering of content by a client device, such as an embedded image in a document with an address of the audience measurement server.

At step 306, the audience measurement server may receive and/or aggregate demographic information for the client devices identified as transmitting a communication associated with the broadcast event. In some implementations, aggregation of demographic information may be performed later, such as before step 310. Demographic information may be received from the client device with a request, such as parameter and value pairs or other such information, or may be retrieved from a demographic characteristic database of characteristics and values associated with device identifiers. Upon identifying a communication associated with the broadcast event and a corresponding device identifier, in such implementations, the audience measurement server may retrieve the demographic characteristics from the database. Characteristics may be received responsive to surveys, profiles, or other such data. Individuals may voluntarily provide the data or agree to allow access the data, or may control whether or how data is transmitted or accessible to the audience measurement server. In many implementations, data may be anonymized or disambiguated, such that no personally identifiable information may be determined for an individual. As discussed above, in many instances, the demographic information may be false or untrustworthy. The audience measurement server may aggregate the demographic information with demographic information of other client devices that transmitted a communication associated with the broadcast event to generate one or more characteristic and value pairs, such as a characteristic or trait and an apparent percentage of appearance of the trait within the identified audience population.

At step 308, in some implementations, if the broadcast event is continuing, steps 304-306 may be repeated iteratively. In other implementations, step 304 may be repeated iteratively with step 306 performed subsequent to the event or after a time period for hysteresis after the event. Accordingly, in some implementations, data collection and analysis may be performed in real time, during an event, while in other implementations, data collection and analysis may be performed after the event, based on communication logs of content providers, client devices, or other devices. In such latter implementations, steps 302-306 may be performed at a time after the end of the broadcast event, and steps 304 and 306 may be performed iteratively for a plurality of client devices.

At step 310, the audience measurement server may correlate aggregated demographic information of the client devices that transmitted a communication associated with the broadcast event with demographic data received from a panel or broadcast provider. The correlation may be performed for one characteristic or trait and a corresponding value, or may be performed iteratively for a plurality of characteristics and values. As discussed above, the value for a characteristic may comprise an identifier of a percentage of the audience (either measured online or from the panel participant data) that includes the characteristic. These values may be compared and correlated to detect similarities or differences in the measurement data.

At step 312, the audience measurement server may determine if the correlation coefficient for a characteristic and value is above a threshold. The threshold may be preconfigured or may be set dynamically. In one implementation, the threshold may be set dynamically responsive to the number of client devices in the population identified at steps 304-306, such that a higher threshold may be used with a larger population and a lower threshold with a smaller population to allow for higher variability. If the correlation coefficient for the characteristic is below the threshold, then at step 314, the audience measurement server may decrease a confidence score for the demographic characteristic and value being correct for the broadcast event. If a panel provider identifies an audience for a broadcast event as having characteristic a at a rate of 80%, and the audience measurement server identifies an audience of devices requesting content associated with the event as having characteristic a at a rate of 20%, the two values are not closely correlated, and the audience measurement server may decrease a confidence score that an audience of the broadcast event has characteristic a at a rate of 80%. This may indicate that the panel participants are not representative of the larger population.

Conversely, if the correlation coefficient for the characteristic is above the threshold, then at step 316, the audience measurement server may increase the confidence score for the demographic characteristic and value being correct for the broadcast event. Referring to the above illustration, if the audience measurement server instead identified an audience of devices requesting content associated with the event as having characteristic a at a rate of 75%, the two values are closely correlated, and the audience measurement server may increase a confidence score that an audience of the broadcast event has characteristic a at a rate of 80%. This may indicate that the panel participants are representative of the larger population.

Steps 310-316 may be repeated for a plurality of characteristics. Panel demographic data frequently identifies a plurality of characteristics of an audience. Each characteristic and value may be compared with online measurement data to adjust confidence scores for each characteristic. Turning to FIG. 3B and continuing with method 300', at step 322, the audience measurement server may determine if a confidence score for a characteristic exceeds a threshold. The threshold may be preconfigured, or may be dynamically adjusted, in some implementations, based on a population size of a panel, with a lower threshold for smaller panel sizes. Thresholds may also be dynamically adjusted relative to other confidence levels. If a confidence level for a first characteristic is low, then a threshold may be lowered for a confidence level for a second characteristic, under the assumption that if the first characteristic and value is incorrect for the audience population, the second characteristic and value are also more likely to be incorrect.

At step 324, if the confidence level for the characteristic is below the threshold, then the audience measurement server may identify the demographic data provided by the panel provider and/or broadcast provider for the broadcast event as suspect. Identifying the demographic data as suspect may include transmitting a notification to the panel provider that the data is not trusted, weighting the demographic data lower during marketing analyses or content schedule planning, etc.

Conversely, at step 326, if the confidence level for the characteristic is above the threshold, then the audience measurement server may identify the demographic data provided by the panel provider and/or broadcast provider for the broadcast event as likely correct. The characteristic may then be used to enhance online measurement data, by identifying demographic information of a device that transmitted a request for content associated with the broadcast event that does not include the characteristic as potentially suspect or false. If a confidence level is high that audience members of a broadcast event have characteristic a, and a device communicated a request associated with the broadcast event but is associated with demographic information not including characteristic a, then it may be possible that a user of the device has provided false demographic information to the audience measurement server. The audience measurement server may identifying the demographic information of the device as suspect, such as via a flag or other setting associated with a device identifier of the device within a database. The audience measurement server may exclude the device from audience demographic or marketing analyses or may reduce the weight given to demographic information from the device during such analyses, reducing the impact of false information on the audience measurement system.

In many implementations, steps 322-326 and/or 310-326 may be performed for a plurality of characteristics, either iteratively or in parallel. In some implementations, devices may only be excluded from or weighted down in subsequent analyses if a predetermined number of characteristics of demographic information of the device are marked as suspect at step 326. If high confidence demographic data for a broadcast event indicates the audience is likely to have characteristics a, b, and c, and a device that transmitted a request for content associated with the broadcast event does not include any of the characteristics, the demographic data of the device may be marked as suspect; conversely, in such implementations, if a second device has characteristics a and b, but not c, the second device may not be marked as suspect. This may provide for additional granularity and variation in legitimate demographic data.

As discussed above, in many such implementations, the collected data may be anonymized or disambiguated to protect the privacy, particularly for individuals that are not panel participants. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for enhancing audience measurement data, comprising:
   receiving, by an audience measurement server from an audience panel provider, demographic data for a broadcast event;
   identifying, by the audience measurement server, a plurality of internet requests from a corresponding plurality of client devices, the plurality of internet requests associated with the broadcast event;
   receiving, by the audience measurement server, demographic information for each of the plurality of client devices;
   calculating, by the audience measurement server, a correlation between a first value of the received demographic information for each of the plurality of client devices and a corresponding value of the received demographic data for the broadcast event;
   determining, by the audience measurement server, that the correlation exceeds a predetermined threshold; and
   identifying demographic information of a first client device of the plurality of client devices as suspect, by the audience measurement server, responsive to the determination that the correlation exceeds the predetermined threshold and responsive to the demographic information of the first client device not including the first value.

2. The method of claim 1, wherein receiving demographic data for a broadcast event comprises receiving demographic data from an audience panel provider for a broadcast block including the event.

3. The method of claim 1, wherein identifying a plurality of internet requests from a corresponding plurality of client devices associated with the broadcast event comprises identifying a plurality of requests for content associated with the broadcast event within a predetermined period of time from the broadcast event.

4. The method of claim 1, wherein identifying a plurality of internet requests from a corresponding plurality of client devices associated with the broadcast event comprises identifying a plurality of search queries for terms associated with the broadcast event within a predetermined period of time from the broadcast event.

5. The method of claim 1, wherein receiving demographic information for each of the plurality of client devices further comprises receiving results of a demographic survey for each of the plurality of client devices.

6. The method of claim 1, wherein calculating a correlation between a first value of the received demographic information for each of the plurality of client devices and a corresponding value of the received demographic data for the broadcast event further comprises aggregating the received demographic information for each of the plurality of client devices, and correlating the aggregated demographic information and the received demographic data for the broadcast event.

7. The method of claim 1, further comprising increasing a confidence score of the first value of the received demographic data from the audience panel provider, responsive to the correlation exceeding the predetermined threshold.

8. The method of claim 1, further comprising decreasing a confidence score of the received demographic information for each of the plurality of client devices not including the first value.

9. The method of claim 1, further comprising:
   decreasing a confidence score of the received demographic data for the broadcast event, responsive to a determination that a correlation between a second value of the received demographic information for each of the plurality of client devices and a corresponding second value of the received demographic data for the broadcast event does not exceed the predetermined threshold.

10. A system for enhancing audience measurement data, comprising:
    a first device in communication with a plurality of client devices and an audience panel provider, comprising a processor and a memory, the processor configured for:
    receiving, from the audience panel provider, demographic data for a broadcast event;
    identifying a plurality of internet requests from the plurality of client devices, the plurality of internet requests associated with the broadcast event;
    receiving demographic information for each of the plurality of client devices;
    calculating a correlation between a first value of the received demographic information for each of the plurality of client devices and a corresponding value of the received demographic data for the broadcast event;
    determining that the correlation exceeds a predetermined threshold; and
    identifying demographic information of a first client device of the plurality of client devices as suspect, responsive to the determination that the correlation exceeds the predetermined threshold and responsive to the demographic information of the first client device not including the first value.

11. The system of claim 10, wherein the processor is further configured for receiving demographic data from an audience panel provider for a broadcast block including the event.

12. The system of claim 10, wherein the processor is further configured for identifying a plurality of requests for content associated with the broadcast event within a predetermined period of time from the broadcast event.

13. The system of claim 10, wherein the processor is further configured for identifying a plurality of search queries for terms associated with the broadcast event within a predetermined period of time from the broadcast event.

14. The system of claim 10, wherein the processor is further configured for receiving results of a demographic survey for each of the plurality of client devices.

15. The system of claim 10, wherein the processor is further configured for aggregating the received demographic information for each of the plurality of client devices, and correlating the aggregated demographic information and the received demographic data for the broadcast event.

16. The system of claim 10, wherein the processor is further configured for increasing a confidence score of the first value of the received demographic data from the audience panel provider, responsive to the correlation exceeding the predetermined threshold.

17. The system of claim 10, wherein the processor is further configured for decreasing a confidence score of the received demographic information for each of the plurality of client devices not including the first value.

18. The system of claim 10, wherein the processor is further configured for:
    decreasing a confidence score of the received demographic data for the broadcast event, responsive to a determination that a correlation between a second value of the received demographic information for each of the plurality of client devices and a corresponding second value of the received demographic data for the broadcast event does not exceed the predetermined threshold.

19. A non-transitory computer-readable storage medium storing instructions that when executed by one or more data processors, cause the one or more data processors to perform operations comprising:
receiving, from an audience panel provider, demographic data for a broadcast event;
identifying, by the audience measurement server, a plurality of internet requests from a corresponding plurality of client devices, the plurality of internet requests associated with the broadcast event;
receiving demographic information for each of the plurality of client devices;
calculating a correlation between a first value of the received demographic information for each of the plurality of client devices and a corresponding value of the received demographic data for the broadcast event;
determining that the correlation does not exceed the predetermined threshold; and
decreasing a confidence score of the received demographic data for the broadcast event.

20. The non-transitory computer-readable storage medium of claim 19, wherein identifying the plurality of internet requests from the corresponding plurality of client devices further comprises identifying internet requests associated with the broadcast event at an communication rate, during a period after a start of the broadcast event, increased from a baseline communication rate.

* * * * *